June 29, 1926.
R. P. LANSING
1,590,528
REDUCTION GEARING
Original Filed June 30, 1919
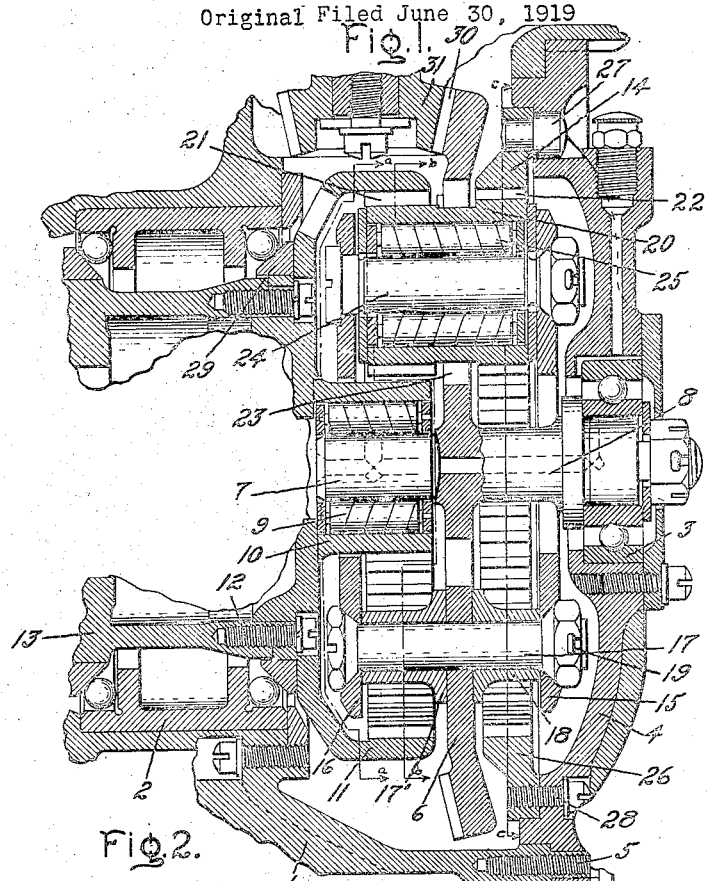
Inventor:
Raymond P. Lansing,
by Albert G. Davis
His Attorney.

Patented June 29, 1926.

1,590,528

UNITED STATES PATENT OFFICE.

RAYMOND P. LANSING, OF MONTCLAIR, NEW JERSEY, ASSIGNOR, BY MESNE ASSIGNMENTS, TO ECLIPSE MACHINE COMPANY, OF ELMIRA HEIGHTS, NEW YORK, A CORPORATION OF NEW YORK.

REDUCTION GEARING.

Original application filed June 30, 1919, Serial No. 307,713. Divided and this application filed July 7, 1920. Serial No. 394,470.

This invention relates to gearing and with regard to the more specific features thereof, to reduction gearing of the planetary type.

The apparatus of my invention has its preferred application to engine starting apparatus in which it serves as a torque multiplying transmission between a small motor preferably electric or a hand crank, and the engine to be started.

One of the objects of the invention is to provide apparatus of the above type having a high reduction ratio, which shall be compact in construction, light in weight and reliable in action.

Another object is to provide apparatus of the type mentioned which shall be substantially noiseless in action and the efficiency of which shall be high.

Other objects will be in part obvious and in part pointed out hereinafter.

The invention accordingly consists in the features of construction, combinations of elements and arrangement of parts which will be exemplified in the construction hereinafter set forth and the scope of the application of which will be indicated in the following claims.

In the accompanying drawings in which is shown one of various possible embodiments of the several features of this invention, Fig. 1 is a fragmentary view of the casing of starting apparatus showing my gearing mounted therein, Fig. 2 shows a sectional view of my reduction gearing taken along the lines a—a, b—b and c—c of Fig. 1 with parts broken away for each section to show corresponding sector views of the gearing.

Similar reference characters refer to similar parts throughout the different views of the drawings.

This application is a division of my copending application, Serial No. 307,713 filed June 30th, 1919.

Referring now to the drawings I have shown at 1 a fragment of that portion of the casing of a starting apparatus in which my planetary gearing is preferably housed. This casing encloses a ball bearing 2 near its forward end or the end from which the torque is delivered to the engine and a second ball bearing 3 is disposed within a cover 4 secured by screws as at 5 for closing the opening in the casing 1. My planetary gear unit is preferably supported by and between the ball bearings 2 and 3, and includes a gear 6 having an integral rearwardly extending axle 8 lodged in ball bearing 3 and an integral forwardly extending axle 7, the latter rotatably supported in a roller bearing 9 lodged within a support 10 formed integral with the internal gear 11 to be more fully described below. The internal gear is preferably secured by screws 12 to a barrel 13 lodged in ball bearing 2 only a fragment of the barrel being shown. The barrel serves to deliver the torque from the internal gear to the engine (not shown) through mechanism, no part of this invention and fully shown in the parent specification of which the present application is a division.

The gear 6 forms a spider for carrying a set of preferably three plantary gear units 14 in a manner now to be described. A pair of spider plates 15 and 16 are secured to the gear or spider 6 in spaced relation therefrom one on each side thereof. For this purpose I provide at each of preferably three equidistant points, a bolt 17 extending transversely through spider plate 15, spider 6 and spider plate 16. A pair of spacer collars 17 and 18 are provided about each bolt, one on each side of the spider, thus spacing the spider plates from said spider. Any appropriate means such as shown at 19 is provided for locking bolts 17 in position.

Each planetary gear unit 14 preferably comprises a hub 20 having a gear 21 cut integrally thereon at one end and a gear 22 at the other, the number of teeth of gear 21 being less than that of gear 22, the gears 21 being all on one side of the spider 6, and the gears 22 symmetrically with respect thereto on the opposite side of the spider. Three equidistant openings 23 are preferably provided in the spider 6, through each of which extends one of the planetary units 14, each being mounted in place by means of a bolt pin 24 passing transversely through the spider plates and secured thereto, and having mounted thereon a roller bearing 25 about which the gear hub 20 may rotate.

Cooperating with the set of gears 22 I provide a stationary internal gear 26 preferably secured to the cover 4 by dowels 27 and bolts 28. The rotatable internal gear 11 heretofore referred to has preferably a somewhat lesser number of teeth than gear 26 and meshes with the set of gears 21. A portion of the inner race of ball bearing 2 is mounted upon a part of the internal gear structure 11 as at 29.

By preference the gear or spider 6 has bevel teeth upon its periphery as shown at 30 and is driven from a bevel pinion 31 having its axis at right angles to that of the spider and preferably formed rigid upon the starting motor shaft (not shown).

In operation, torque will be transmitted through bevel pinion 31 causing a rotation of the spider 6 with its axle portions 7 and 8 rotating in roller bearing 9 and ball bearing 3 respectively.

The spider plates 15 and 16 being rigid with the spider, rotate with it thus causing a revolution of the planetary units 14 about the spider axle. By reason of the cooperation of gears 22 on the planetary units with internal gear 26, each hub 20 is caused to rotate about its pin 24 and to impart rotation to the gear 21 which is integral therewith. By the well understood differential action which need not be set forth at length, the internal gear 11 is thus rotated at a reduced speed bearing a definite low ratio with respect to the speed of spider 6 and a still lower ratio with respect to the speed of pinion 31 and the torque is transmitted from the internal gear through the barrel member 13 to the engine (not shown).

By disposing the gear or spider midway between the two sets of planetary gears I provide a well balanced construction in which substantially the entire thrust is applied in the direction of the torque transmission, objectionable side thrust being substantially eliminated. The axle construction of the spider 6 also contributes to this result by tending to prevent rotation of the spider out of its plane. As the cooperating gear teeth are thus unlikely to come out of alignment, frictional losses and the noises incident thereto in operation are minimized. My specific manner of mounting the planetary units in the spider contributes further to high efficiency as it renders possible the use of roller bearings therefore with their axes substantially rigid with the spider.

Although my reduction gearing has its preferred application as above noted to torque multiplying mechanism for engine starting purposes it will be understood that this invention may be applied to advantage in numerous other relations and is particularly useful in any relation where a high reduction ratio is required, where high efficiency is important and where compactness also is a desideratum.

My gearing as can readily be seen is reversible in action and can be used to advantage as speed multiplying and torque reducing mechanism, the power being applied in such case at the internal gear 11 and delivered to the bevel gear 31.

I claim:—

1. In reduction gearing, in combination, a pair of internal gears, one stationary and one rotatable, a spider located and rotatable between said internal gears and having peripheral gear teeth, a pair of rigidly connected gears mounted in said spider and meshing one with each internal gear, and a power gear meshing with said peripheral gear teeth of the spider.

2. In reduction gearing, in combination, a pair of internal gears, one stationary and one rotatable, a spider located and rotatable between said internal gears and comprising a spider gear and parallel plates secured to opposite sides of such spider gear, and a series of pairs of rigidly connected gears which are mounted in openings in said spider gear and plates, each pair of gears meshing one with each internal gear, and a power gear meshing with the periphery of the spider gear.

3. In reduction gearing, in combination, a pair of internal gears, a spider between said internal gears, means for applying torque to said spider, a pair of planetary gears rigidly connected to each other, and extending through an opening in said spider for cooperation of one planetary with each internal gear, a bearing for said planetary gears, and means supporting said bearing to move with said spider.

4. In reduction gearing, in combination, a pair of internal gears, one stationary and one rotatable, a spider between said internal gears, means for applying torque to said spider, a pair of spider plates on opposite sides of said spider, and secured thereto in spaced relation, a plurality of planetary gear hubs, each cooperating with both said internal gears, each said hub extending through an opening in said spider, and having a roller bearing, and a pin supporting said bearing and in turn supported by said spider plates.

5. In reduction gearing, in combination, a spider, means for centrally journalling the same, means for applying torque near the periphery thereof, a pair of aligned planetary gears carried by said spider, and projecting on opposite sides thereof, and a pair of internal gears one cooperating with each of said planetary gears.

6. In reduction gearing, in combination, a spider, a gear at the periphery thereof, a plurality of hubs, each having a pair of gears rigid therewith, each hub extending through an opening in said spider, with the gears projecting, means supporting said gears with respect to said spider, and a pair of internal gears one on each side of said spider, for cooperating with said planetary gears.

7. In reduction gearing, in combination, a spider having an integral central axle, bearings therefor, a stationary and a movable internal gear, one on each side of said spider, two spider plates secured to said spider on opposite sides thereof and spaced therefrom, a plurality of pins connecting said plates and a plurality of planetary gear units, one having a bearing on each pin and extending, each, through an opening in said spider, each unit comprising two aligned gears for cooperation one with the stationary and the other with the movable internal gear.

8. In reduction gearing, in combination, a spider having an integral central axle, bearings therefor, a stationary and a movable internal gear, one on each side of said spider, two spider plates secured to said spider on opposite sides thereof and spaced therefrom, a plurality of pins connecting said plates, a plurality of planetary gear units, one having a bearing on each pin and extending, each, through an opening in said spider, each unit comprising two aligned gears for cooperation one with the stationary and the other with the movable internal gear, and gear teeth on the periphery of said spider for driving the same.

9. In reduction gearing, in combination, a spider having gear teeth on its periphery, a pair of spider plates one on each side of said spider, a plurality of bolts extending transversely of said plates and spider to secure them together, a pair of spacer collars about each bolt, one between the spider and each of the plates, to space the plates from the spider, and planetary gear units supported by said plates, and extending transversely through corresponding openings in said spider.

10. In reduction gearing, in combination, a pair of internal gears, one stationary and one rotatable, a spider located and rotatable between said internal gears, means for rotating said spider, a plurality of sleeves mounted on the spider and having two sets of gear teeth thereon on opposite sides of such spider, the corresponding members of one set meshing with one of the internal gears and the corresponding members of the other set meshing with the other of said internal gears.

In witness whereof, I have signed my name to this specification this 2nd day of July, 1920.

RAYMOND P. LANSING.